United States Patent [19]
Kwon

[11] Patent Number: 6,122,453
[45] Date of Patent: *Sep. 19, 2000

[54] APPARATUS AND METHOD FOR FILM TRANSPORT AND DATA MAGNETIC WRITING OF AN APS CAMERA

[75] Inventor: Young-Rae Kwon, Kyeongsangnam-do, Rep. of Korea

[73] Assignee: Samsung Aerospace Industries, Ltd., Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 09/112,681

[22] Filed: Jul. 9, 1998

[30] Foreign Application Priority Data

Jul. 9, 1997 [KR] Rep. of Korea ...................... 97-31681

[51] Int. Cl.$^7$ .............................. G03B 17/24; G03B 1/00
[52] U.S. Cl. ........................... 396/319; 396/397; 396/406
[58] Field of Search ...................................... 396/319, 320, 396/395, 397, 406, 310, 311, 409

[56] References Cited

U.S. PATENT DOCUMENTS 5,708,887  1/1998  Funaki et al. ..................... 396/397 X
5,899,589  5/1999  Yasukawa et al. .................... 396/319

Primary Examiner—Alan A. Mathews
Attorney, Agent, or Firm—Fish & Richardson P.C.

[57] ABSTRACT

An apparatus for transporting a film in an APS camera and for magnetically writing data on the film includes a release switch, a single perforation sensing unit, a controller, a film transporting unit, and a data writing unit. After a frame of the film is exposed, the controller starts to write data after a first perforation is sensed and stops the film transport operation after a second perforation is sensed. The controller decreases a pulse period of a transport signal controlling the film transport operation when the second perforation is being sensed, and stops to output the signal after the second perforation has been sensed.

10 Claims, 6 Drawing Sheets

FIG.1

Prior Art

APPARATUS AND METHOD FOR FILM TRANSPORT AND DATA MAGNETIC WRITING OF AN APS CAMERA

BACKGROUND OF THE INVENTION (a) Field of the Invention

The present invention relates to an APS (Advanced Photo System) camera, more particularly to an apparatus and a method for transporting a film in an APS camera and magnetically writing data on the film.

(b) Description of the Related Art

An APS camera differs in various ways from a conventional camera using a 35 mm film. First, the APS camera uses a film having two perforations formed on an edge of each frame, unlike the 35 mm film which has eight perforations formed along two opposing edges of each frame. Second, the APS camera has a magnetic writing unit capable of writing data on the frame surface of the film. The data include date and time information about the photographed object and so on. The APS camera is capable of selecting and using unexposed frames from a film which has both exposed and unexposed frames.

Figure 1:
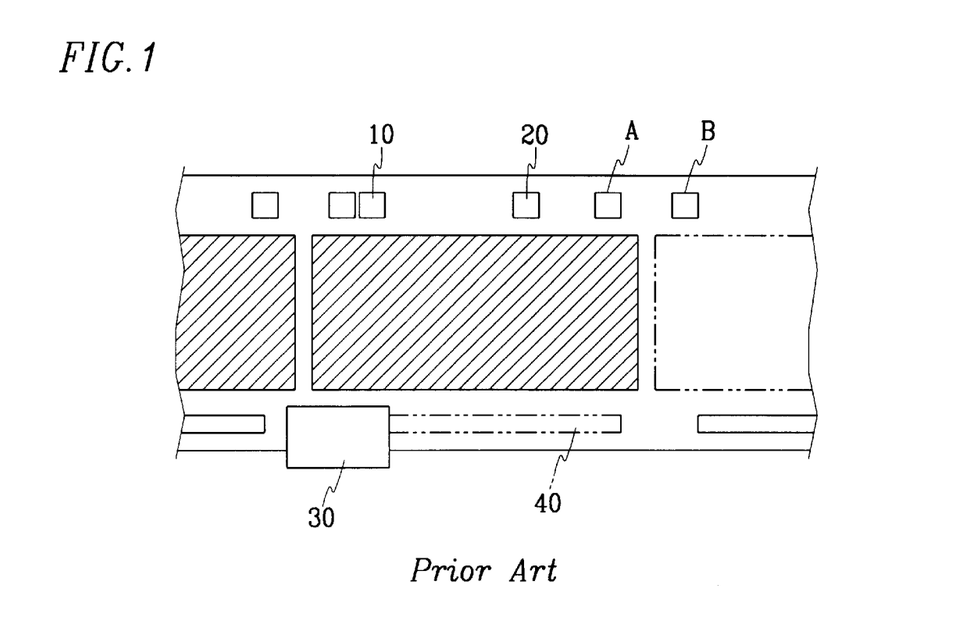
FIG. 1 shows initial positions of two perforation sensing units for transporting a film and for magnetically writing data in a conventional APS camera.

A conventional structure of the APS camera to transport the film and to write data is shown in FIG. 1. As shown in FIG. 1, the APS camera has a first and a second perforation sensing units 10 and 20, respectively, and a data writing unit 30. Also, a magnetic stripe 40 is formed on a lower portion of each frame of the film.

The first perforation sensing unit 10 is used to stop the magnetic writing operation and to wind an exposed frame of the film. The second perforation sensing unit 20 is used to start magnetic writing operation.

When a release button is operated by a user, a frame of the film is exposed. After exposure, the frame is transported by a motor (not shown) to begin the transport operation. At that time, the data writing unit 30 magnetically writes data on the magnetic disk 40 when a first perforation A is sensed by the second perforation sensing unit 20, and stops the data writing operation when the first perforation A is sensed by the first perforation sensing unit 10. The film transport operation is stopped when a second perforation B is sensed by the first perforation sensing unit 10.

Manufacturing cost of the APS camera is high, since the APS camera uses two perforation sensing units to transport the film and to write data. Also, providing spaces for two perforation sensing units becomes more difficult as the APS camera is made more compact.

SUMMARY OF THE INVENTION

In view of the prior art described above, it is an object of the present invention to provide an apparatus and a method for transporting a film and for magnetically writing data of an APS camera using a single perforation sensing unit.

The above object is attained with the present invention by an apparatus which includes a single perforation sensing unit which senses a perforation formed in the film, and outputs a signal according to the perforation sensed; a control unit which controls the transport of the film in the APS camera and the writing process of the magnetic data in response to the signal outputted from the perforation sensing unit; a film transporting unit which transports the film according to control signals received from the control unit; and a data writing unit which writes the magnetic data on the film according to the control signals received from the control unit.

In a first embodiment of the invention, the perforation sensing unit is initially located between a perforation of a frame which is being transported and a perforation of the immediately preceding frame.

In another embodiment of the invention, the perforation sensing unit is initially located over a perforation of the immediately preceding frame. The invention also provides a method for transporting a film in an APS camera and writing magnetic data on the film with the apparatus of the invention, comprising the steps of starting transporting the film after a frame of the film is exposed; sensing with a single sensing unit at least one of a plurality of perforations formed in the film; writing the magnetic data on the film according to the sensing of the perforations; and stopping the film transport operation according to the sensing of the perforations.

The writing step starts after the perforation is sensed.

The step of stopping the film transport operation decreases a pulse period of a signal for the film transport operation when a subsequent perforation is sensed, and stops output of the signal when the sensing of the subsequent perforation is finished.

BRIEF DESCRIPTION OF THE DRAWINGS

The above objects and feature of the present invention will be apparent from the following description of the preferred embodiment with reference to the accompanying drawings.

DETAILED DESCRIPTION OF THE PREFERRED EMBODIMENTS

Reference will now be made in detail to the preferred embodiments of the present invention, examples of which are illustrated in the accompanying drawings.

Figure 2:
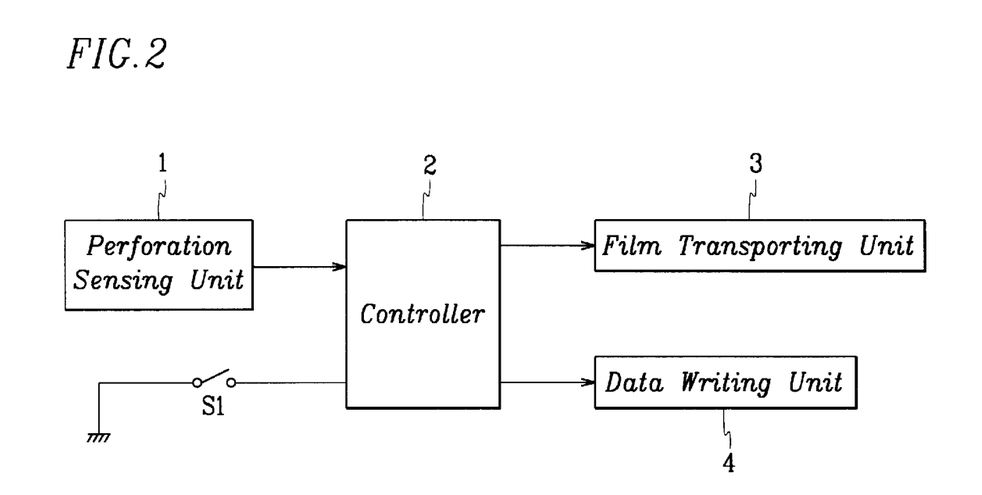
FIG. 2 is a block diagram of an apparatus for transporting a film and for magnetically writing data according to an embodiment of the present invention.

As shown in FIG. 2, an apparatus for transporting a film and for magnetically writing data in an APS camera in accordance with the present invention includes a release switch S1, a perforation sensing unit 1, a controller 2, a film transporting unit 3, and a data writing unit 4.

Figure 4:
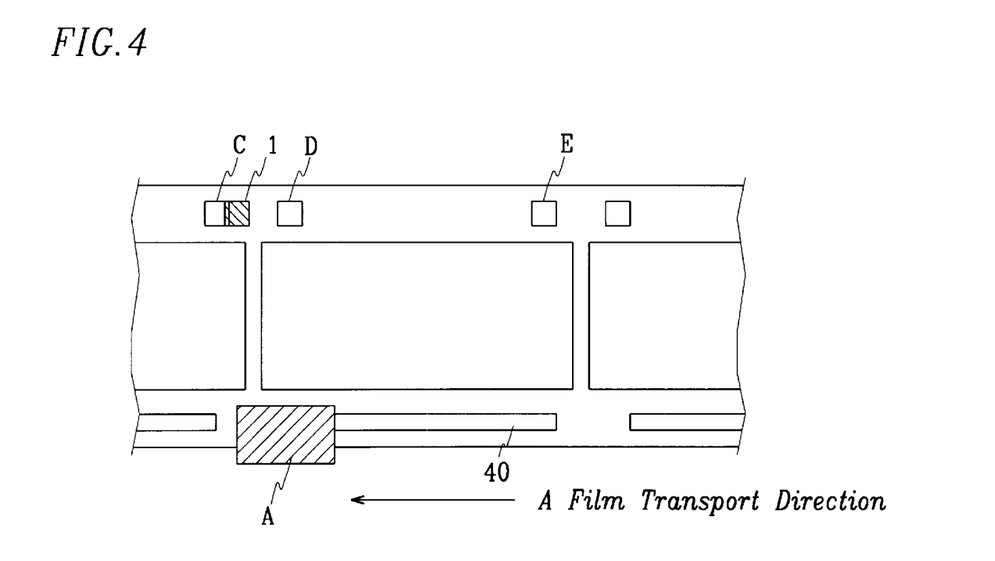
FIG. 4 shows an initial positions of a perforation sensing unit according to a first embodiment of the present invention.

Also, as shown in FIG. 4, a magnetic stripe 40 is formed on lower portion of each frame of the film.

The release switch S1 is operated by a user to photograph an object and outputs electric signals according to an operation by the user.

As shown in FIG. 4, each frame of the film for an APS camera has only two perforations which are formed on one side of the film. A first perforation is formed at a start position to indicate the start position of the frame, and a second perforation is formed at an end position to indicate the end position of the frame.

In the first embodiment of the invention, the perforation sensing unit 1 is initially located between a start perforation D formed on a frame being transported and an end perforation C formed on the previous frame. In the second embodiment of the invention illustrated in the FIG. 7, the perforation sensing unit 1 is initially located over the end perforation C of the previous frame.

The film transporting unit 3 has a motor (not shown) which is controlled by the controller 2, to transport the film until an exposed frame of the film is in place ready to photograph an object.

Figure 3:
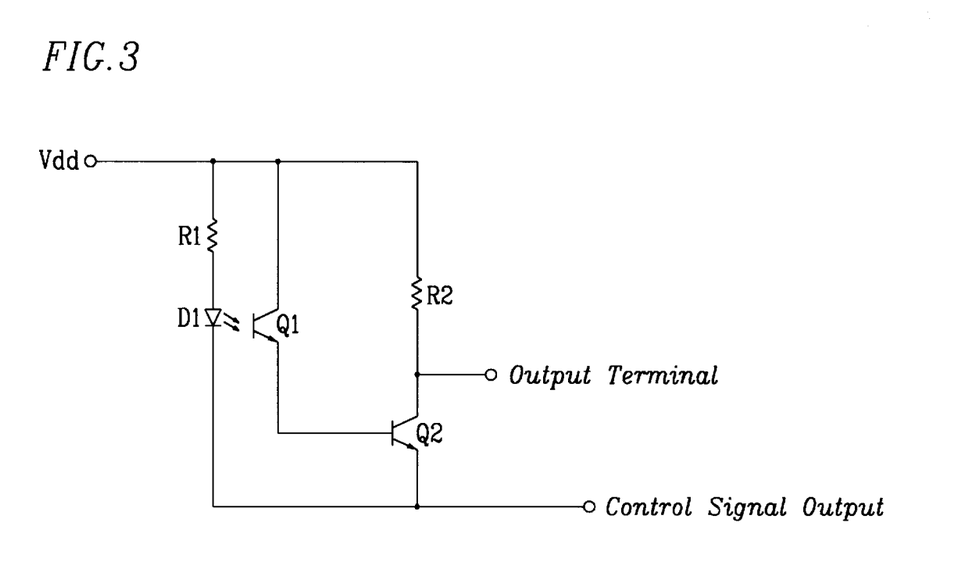
FIG. 3 is a detailed circuit of a perforation sensing unit according to an embodiment of the present invention.

As shown in FIG. 3, the perforation sensing unit 1 consists of a first resistor R1 and a second resistor R2 which are connected to a supply voltage Vdd, respectively, a light-emitting diode Dl and a photo transistor Q1, and a transistor Q2. The collector terminal of the transistor Q2 is connected to the input terminal of the controller 2.

If the light-emitting diode D1 emits a light beam which passes through a perforation, the photo transistor Q1 receives the light beam through the perforation and turns on. The transistor Q2 is turned on subsequently. However, if the light-emitting diode D1 emits a light beam onto the film's surface, the photo transistor Q1 does not receive the light beam. Therefore, the photo transistor Q1 is turned off, and the transistor Q2 is turned off.

Accordingly, when a perforation is sensed, light emitted by the light-emitting diode D1 turns on the photo transistor Q1 which then turns on the transistor Q2. The perforation sensing unit 1 outputs a low level signal L when the perforation is sensed. However, when a perforation is not sensed by the light-emitting diode D1 and photo transistor Q1, the transistor Q2 turns off and the perforation sensing unit 1 outputs a high level signal H.

The controller 2, in accordance with signals outputted from the release switch S1 and the perforation sensing unit 1, controls to transport the film and to write data magnetically.

The data writing unit 4 writes data on the magnetic stripe 40 according to the signals output from the controller 2.

Figure 5:
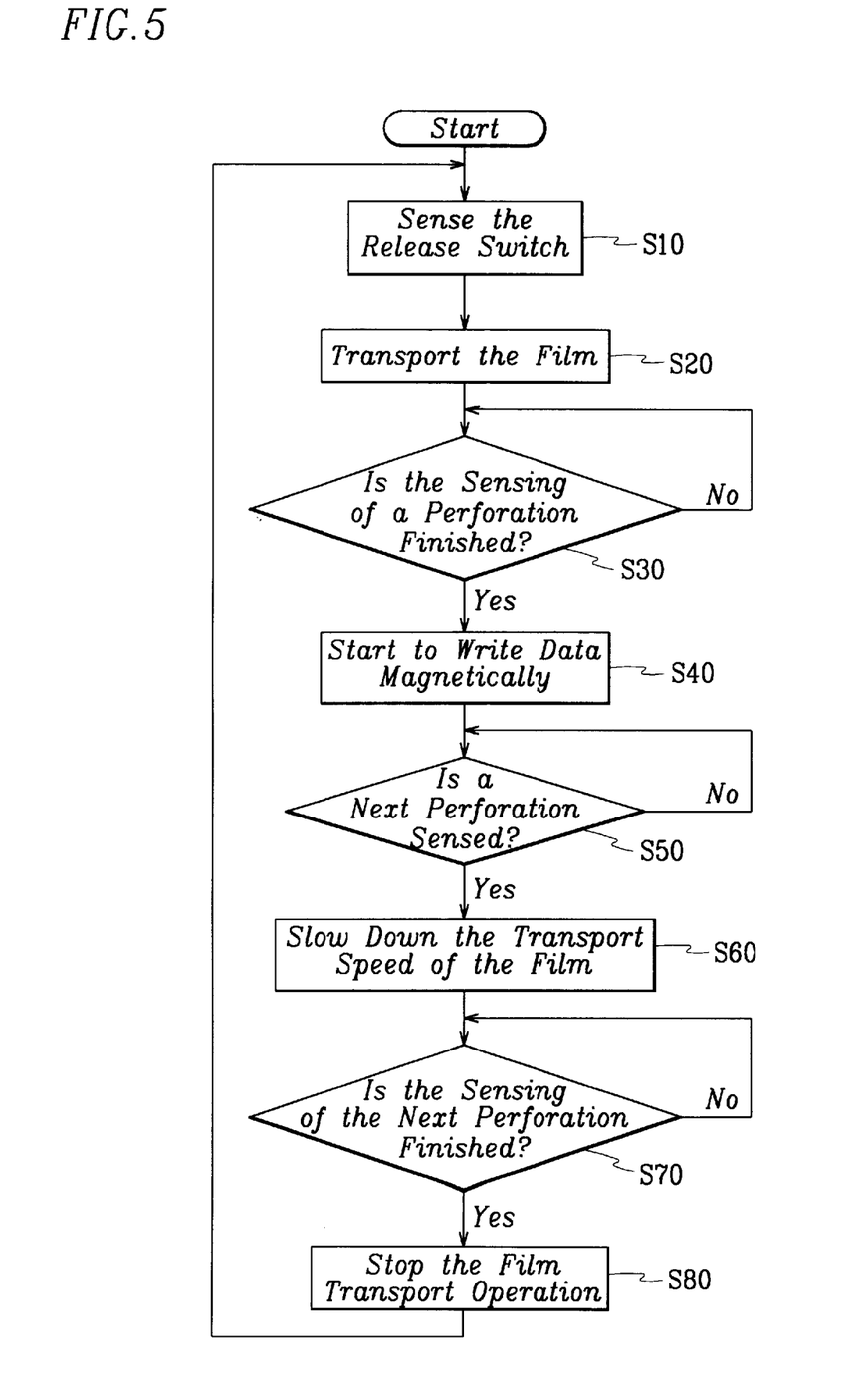
FIG. 5 is a flow chart illustrating a method for transporting the film and for magnetically writing data according to the first embodiment of the present invention.
Figure 6:
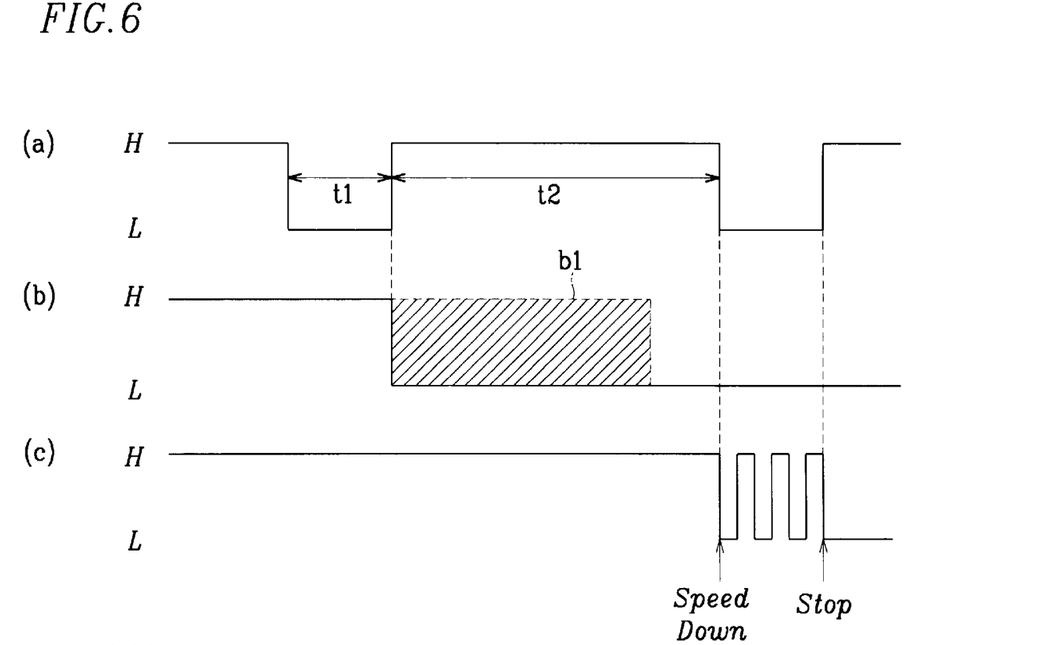
FIGS. 6a to 6c are timing charts for controlling a film transport operation and a data writing operation according to signals outputted from the perforation sensing unit in accordance with the first embodiment of the present invention.

Referring to FIG. 2 to FIG. 6, the operation according to the first embodiment of the present invention is as follows:

As shown in FIG. 5, when the release switch S1 is operated by a user in step S10, the release switch S1 outputs electric signals to the controller 2. The controller 2 outputs control signals to expose a frame of the film. The controller 2 then outputs a control signal to the film transporting unit 3 to transport the exposed frame of the film, step S20. Therefore, the film transporting unit 3 transports the frame of the film according to the signal output from the controller 2.

In step 30, the perforation sensing unit 1 outputs a signal to indicate whether or not a perforation is sensed. If in step 30a the perforation is sensed by the perforation sensing unit 1 during the film transport operation, the perforation sensing unit 1 outputs a low level signal L to the controller 2 while the perforation is being sensed.

The perforation sensing unit 1 first senses a second perforation D during the film transport operation, and outputs a low level signal to the controller 2 as shown in FIG. 6a. Based on this signal, the controller 2 counts a time period t1 while the second perforation D is sensed, and calculates a transport speed of the film. At the end of the time period t1, when the signal output from the perforation sensing unit 1 changes from a low level signal L to a high level signal H, after the second perforation D is sensed the controller 2 outputs a control signal to the data writing unit 4 as shown in FIG. 6b. The data writing unit 4 then starts to write data on the magnetic stripe 40 (step S40). At that time, because a writing period for writing data onto the magnetic stripe 40 has been defined, the controller 2 controls the data writing unit 4 so as to write data during the predetermined writing period. Therefore, because the controller 2 calculates the transport speed of the film, the controller 2 controls the writing speed of the data writing unit 4 according to the calculated transport speed.

Next, the controller 2 counts a time period t2 until a third perforation E is sensed after the second perforation D is sensed by the perforation sensing unit 1. The controller 2 compares the time period t2 with a predetermined time. If the predetermined time exceeds the time period t2, the controller 2 outputs a signal to transport the film to the film transport unit 3.

When the third perforation E is sensed by the perforation sensing unit 1 (step S50), that is, the signal output by the perforation sensing unit 1 changes from a high level signal H into a low level signal L after the second perforation D is sensed, the controller 2 outputs a pulse signal having a short pulse period to the film transporting unit 3. The operating speed of the film transporting unit 1 then slows down, causing the transport speed of the film to slow down as well (step S60).

The signal having the short pulse period is outputted while the third perforation E is sensed by the perforation sensing unit 1. However, when the third perforation E is no longer sensed, the signal output by the perforation sensing unit 1 changes from a low level signal L into a high level signal H, and the controller 2 stops the film transport operation, (step S70).

Therefore, the film transport operation stops when a next perforation E is sensed by the perforation sensing unit 1 and after the transport speed is decreased.

Figure 7:
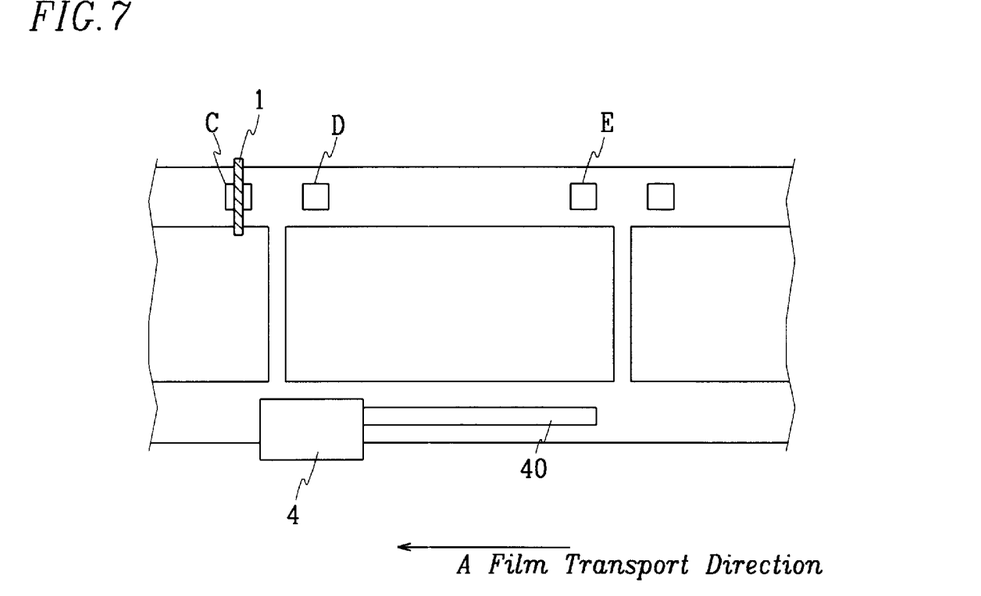
FIG. 7 shows an initial position of a perforation sensing unit according to a second embodiment of the present invention.
Figure 8:
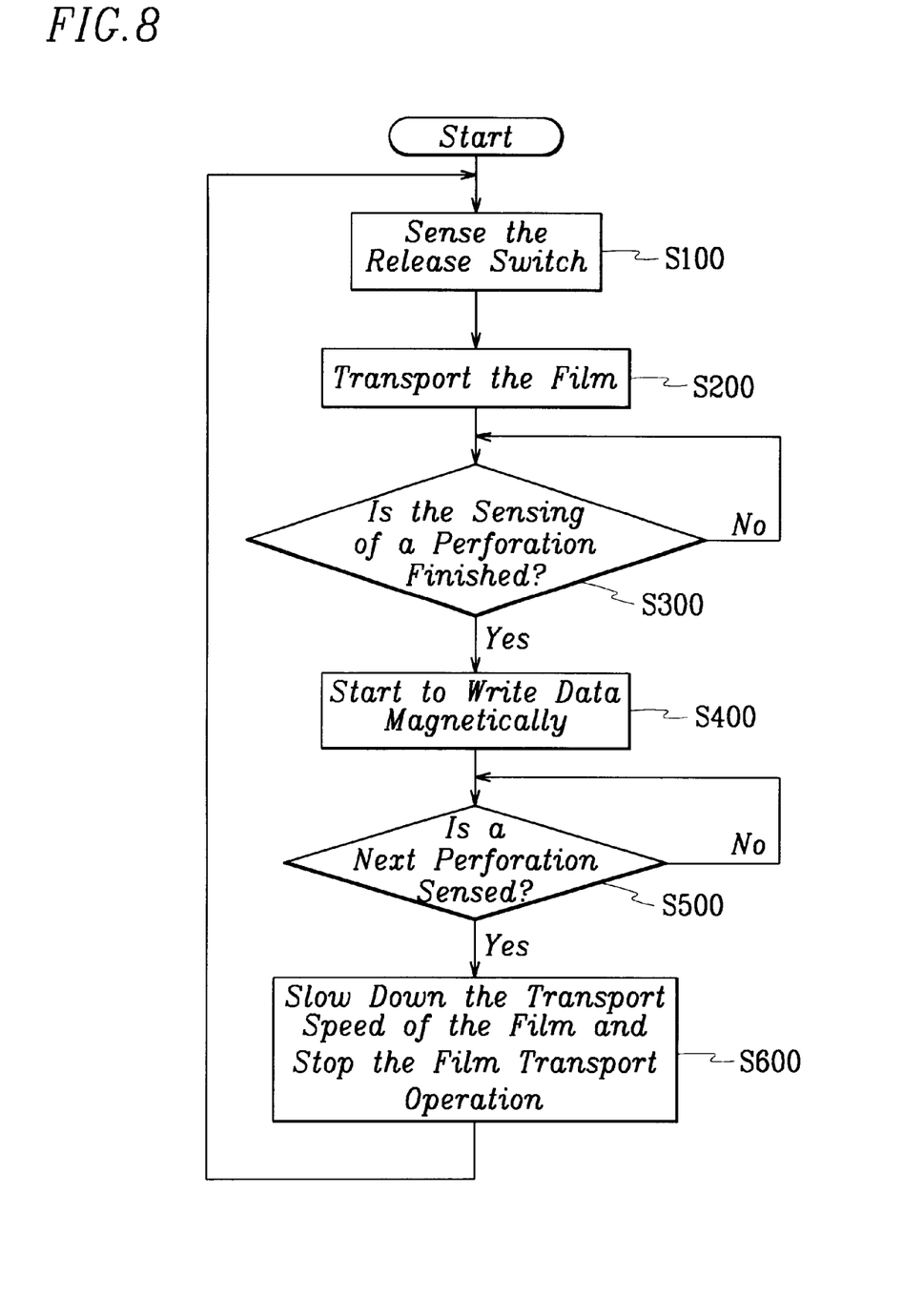
FIG. 8 a flow chart illustrating a method for transporting the film and for magnetically writing data according to the second embodiment of the present invention.
Figure 9:
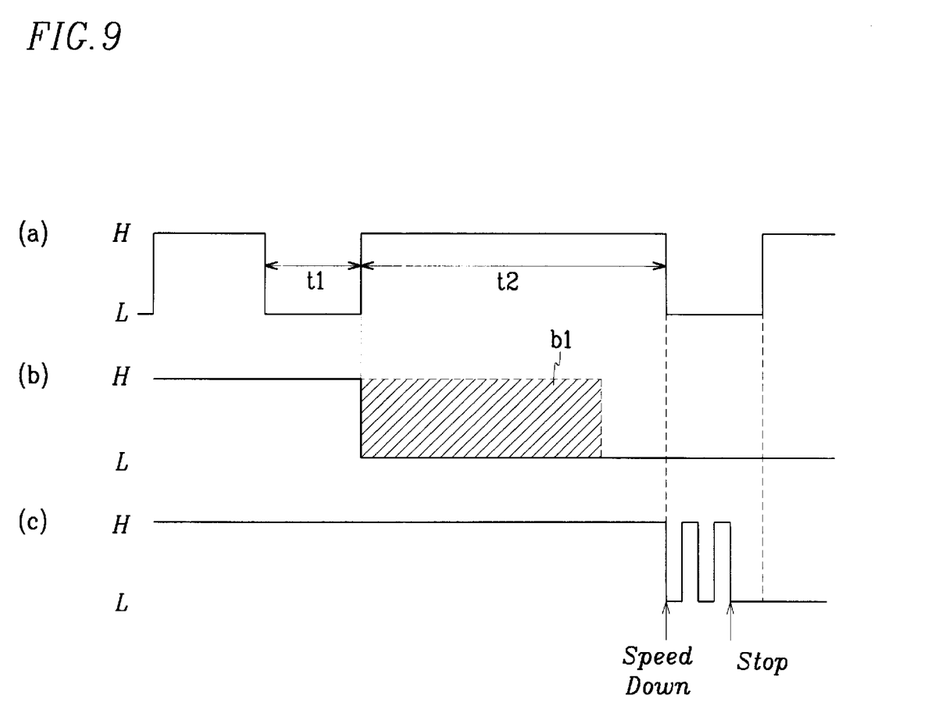
FIGS. 9a to 9c are timing charts for controlling a film transport operation and a data writing operation according to signals output from the perforation sensing unit in accordance with the second embodiment of the present invention.

Referring to FIG. 7 to FIG. 9, a preferred second embodiment of the present invention will now be described in detail.

As shown in FIG. 8, when the release switch S1 is operated by a user, the release switch S1 outputs electric signals to the controller 2, (step S100). The controller 2 then controls an object to be photographed according to the electric signals. So, a frame of the film is exposed by the operation of the release switch S1, and the controller 2 outputs a signal to the film transporting unit 3 to transport the exposed frame of the film, (step S200). Therefore, the film transporting unit 3 transports the frame of the film according to the signal output from the controller 2.

Also, the perforation sensing unit 1 outputs a signal depending on whether or not a perforation is sensed, (step S300). When the perforation is sensed by the perforation sensing unit 1 during the film transport operation, the perforation sensing unit 1 outputs a low level signal L to the controller 2 while a perforation is being sensed.

As shown in FIG. 7, the perforation sensing unit 1 is initially located over an end perforation C of a immediately preceding frame. Therefore, the perforation sensing unit 1 first senses a first perforation C and then senses a second perforation D during the film transport operation, and outputs a signal to the controller 2 according to whether or not a perforation is being sensed, as shown in FIG. 9a.

The controller 2 outputs a signal to the data writing unit 4 to write data on the magnetic stripe 40 when sensing of the second perforation D is finished, as shown in FIG. 9b, (step S400). The data writing unit 4 then starts to write magnetic data according to the signal output from the controller 2.

Next, the controller 2 counts a time period t2 until a third peroration E is sensed after the sensing of the second perforation D is finished. The controller 2 compares the time period t2 with a predetermined time. If the predetermined time exceeds the time period t2, the controller 2 outputs a signal to transport the film to the film transport unit 3.

When the third perforation E is sensed by the perforation sensing unit 1, that is, the signal output by the perforation sensing unit 1 changes from a high level signal H into a low level signal L after the second perforation D has been sensed, the controller 2 outputs a pulse signal having a short pulse period to the film transporting unit 3, (step S500). The operating speed of the film transporting unit 3 is thereby decreased which causes the transport speed of the film to decrease as well.

The signal having the short pulse period is outputted until the third perforation E is no longer sensed, as shown in FIG. 9c. Therefore, before the signal output from the perforation sensing unit 1 changes from a low level signal L into a high level signal H, the controller 3 stops the film transport operation, (step S600).

In the second preferred embodiment of the present invention, because the perforation sensing unit 1 is initially located at an end perforation of an immediately preceding frame, sensing of the second perforation D is delayed. Therefore, the determination of the transport speed of the film due is less influenced by the heavy load when the film transport commences.

Therefore, the preferred embodiments in accordance with the present invention advantageously makes efficient use of the camera space and decrease manufacturing costs.

While it has been shown and described what is at present, considering the preferred embodiments of the invention, it will be obvious to those skilled in the art that various changes and modifications can by readily made therein without departing from the scope and sprit of the invention as defined by the appended claims.

What is claimed is:

1. An apparatus for transporting a film in an APS camera and writing magnetic data on the film, the apparatus comprising:
    a single perforation sensing unit which senses a perforation formed in the film, and for outputting a signal according to the perforation sensed;
    a control unit which controls the transport of the film and the writing of the magnetic data in response to the signal outputted from the perforation sensing unit;
    a film transporting unit which transports the film to position a frame of the film for an exposure according to control signals received from the control unit; and
    a data writing unit which writes the magnetic data while the film is being transported to position the frame according to the control signals received from the control unit;
    wherein, the perforation sensing unit is configured to be initially located between a first perforation of a frame of the film which is being transported and a perforation of an immediately preceding frame;
    wherein the control unit is configured to calculate a transport speed of the film according to a time period during which the first perforation of the frame being transported is being sensed, and controls the writing speed of the magnetic data according to the transport speed.

2. The apparatus of claim 1, wherein the control unit generates a control signal to cause the data writing unit to start to write the magnetic data after the first perforation of the frame being transported is no longer sensed by the perforation sensing unit.

3. The apparatus of claim 1, wherein the control unit outputs a stop signal for stopping the film transport when a second perforation of the frame being transported is sensed by the perforation sensing unit, wherein the stop signal comprises pulses with a short pulse period.

4. An apparatus for transporting a film in an APS camera and writing magnetic data on the film, the apparatus comprising:
    a single perforation sensing unit which senses a perforation formed in the film and outputs a signal according to the perforation sensed;
    a control unit which controls the transport of the film and the writing of the magnetic data according to the signal outputted from the perforation sensing unit;
    a film transporting unit which transports the film to position a frame of the film for an exposure according to control signals received from the control unit; and
    a data writing unit which writes the magnetic data while the film is being transported to position the frame according to the control signals received from the control unit;
    wherein, the perforation sensing unit is configured to be initially located over a perforation of an immediately preceding frame of the film;
    wherein the control unit is configured to calculate a transport speed of the film according to a time period between the time the perforation of the immediately preceding frame is sensed and the time the first perforation of a frame being transported is sensed, and controls the writing speed of the data according to the transport speed.

5. The apparatus of claim 4, wherein the control unit generates a control signal to cause the data writing unit to write the magnetic data after both the perforation of the immediately preceding frame and a first perforation of a frame being transported have been sensed by the perforation sensing unit.

6. The apparatus of claim 4, wherein the control unit outputs a stop signal for stopping the film transport operation during the time a second perforation of a frame being transported is sensed; wherein the stop signal comprises pulses with a short pulse period.

7. A method for transporting a film in an APS camera and writing magnetic data on the film, comprising the steps of:
    starting transporting the film after a first frame of the film is exposed;
    sensing with a single sensing unit at least one of a plurality of perforations formed in the film;
    writing the magnetic data on the film according to the sensing of the perforations, while the film is being transported to position a second frame for an exposure during photographing, comprising the steps of:

calculating a transport speed of the film according to a time period during which the first perforation is sensed; and controlling a writing speed of the magnetic data according to the transport speed; and stopping the film transport operation according to the sensing of the perforations.

8. The method of claim 7, wherein the writing step further comprises the step of:

starting to write the magnetic data after a first perforation of the plurality of perforations is sensed.

9. The method of claim 7, wherein stopping the film transport operation further comprises the steps of:

decreasing a pulse period of a stop signal controlling the film transport operation when a second perforation after a first perforation is sensed; and stopping to output the stop signal when the second perforation is no longer sensed.

10. The method of claim 7, wherein stopping the film transport operation further comprises the steps of:

decreasing a pulse period of a stop signal controlling the film transport operation when a second perforation after a first perforation is sensed; and ceasing to output the stop signal while the second perforation is still being sensed.

* * * * *